United States Patent [19]

Suzuki

[11] Patent Number: 4,979,131

[45] Date of Patent: Dec. 18, 1990

[54] PRINTER APPARATUS

[75] Inventor: Michio Suzuki, Shizuoka, Japan

[73] Assignee: Tokyo Electric Co., Ltd., Tokyo, Japan

[21] Appl. No.: 518,968

[22] Filed: May 4, 1990

[30] Foreign Application Priority Data

May 12, 1989 [JP] Japan .................................. 1-119522

[51] Int. Cl.$^5$ ............................................ G06K 15/00
[52] U.S. Cl. .................................................. 364/519
[58] Field of Search ..................... 364/518, 519, 523; 346/154; 400/65

[56] References Cited

U.S. PATENT DOCUMENTS 4,695,976  9/1987  Yasuhiro ........................... 364/900
4,837,709  6/1989  Sasaki .................................. 364/519

Primary Examiner—Arthur G. Evans
Attorney, Agent, or Firm—Frishauf, Holtz, Goodman & Woodward

[57] ABSTRACT

A printer apparatus is provided with a frame memory for storing a printing pattern, a printing head driven in accordance with the printing pattern stored in the frame memory, and a processor for producing a plurality of graphic patterns in the frame memory in accordance with a plurality of items of printing data which are externally supplied, to thereby form a printing pattern. The processor of the printer apparatus includes a buffer memory and a CPU. The buffer memory stores image distribution data indicating a frame memory area which is occupied by the image portion of the graphic pattern corresponding to printing data to be changed and from which the marginal portions of the graphic pattern is excluded. When printing data which should be used in place of the printing data to be changed is supplied, the CPU reads the image distribution data relating to the printing data to be changed out of the distribution data memory, and clears the frame memory area specified by the image distribution data.

6 Claims, 8 Drawing Sheets

| RECEIVER OOOOO ELECTRIC CO.,LTD | DOCK/GATE B-65 | | |
|---|---|---|---|
| ADVICE NOTE NO(N) 256002511 ‖‖‖‖‖‖‖‖‖‖‖ | SUPPLIER ADDR MINAMI-CHO | | |
| | NET WT (KG) 24 | GROSS WT (KG) 28 | NO. BOXES 1— |
| PART NO(P) 7356890 ‖‖‖‖‖‖‖‖‖ | | | |
| QUANTITY (Q) 65 ‖‖‖‖‖‖ | DESCRIPTION 10 INCH HEAD/2048 | | |
| | SUPPLIER PART NO 19905 | | |
| SUPPLIER (V) 1479 ‖‖‖‖‖‖ | ENGR. CHANGE PO-4 | | |
| | PROD DATE 880229 | HAZARD CODE | |
| SERIAL(S/M/G) 256302589 ‖‖‖‖‖‖‖‖‖ ⋀⋀⋀⋀⋀ | CHARGE NO (H) A-1145 ‖‖‖‖‖‖‖‖‖ | | |

| RECEIVER | OOOOO ELECTRIC CO., LTD | DOCK/GATE | B-65 |
|---|---|---|---|
| ADVICE NOTE NO (N) | 256002511 | SUPPLIER ADDR | MINAMI-CHO |
| ‖‖‖‖‖‖‖‖‖‖‖‖ | | NET WT (KG) 24 | GROSS WT (KG) 28 | NO BOXES 1- |
| PART NO (P) | 7356890 | | |
| ‖‖‖‖‖‖‖‖‖‖ | | | |
| QUANTITY (Q) | 65 | DESCRIPTION | 10 INCH HEAD/2048 |
| ‖‖‖‖‖‖ | | SUPPLIER PART NO | 19905 |
| SUPPLIER (V) | 1479 | ENGR. CHANGE | PO-4 |
| ‖‖‖‖‖‖ | | PROD DATE 880229 | HAZARD CODE |
| SERIAL (S/M/G) | 256302589 | CHARGE NO (H) | A-1145 |
| ‖‖‖‖‖‖‖‖‖‖‖ | | ‖‖‖‖‖‖‖‖‖‖‖ | |

FIG. 3

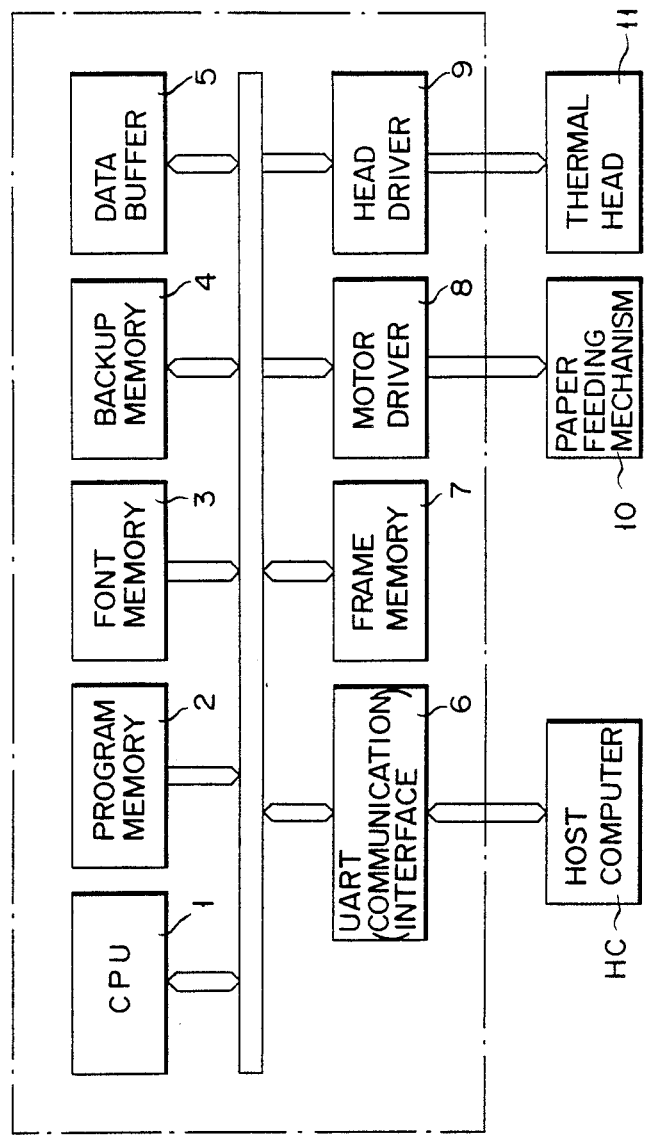
F I G. 4

FIG. 5
| ATTRIB. | X | Y |
|---|---|---|
| 1 | 20 | 236 |
| 2 | 128 | 20 |
| 3 | 236 | 236 |
| 1 | ¦ | ¦ |
| 3 | ¦ | ¦ |
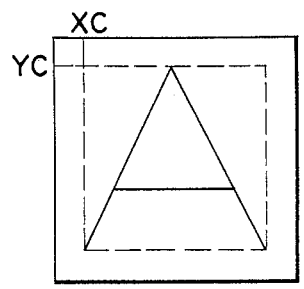
FIG. 6
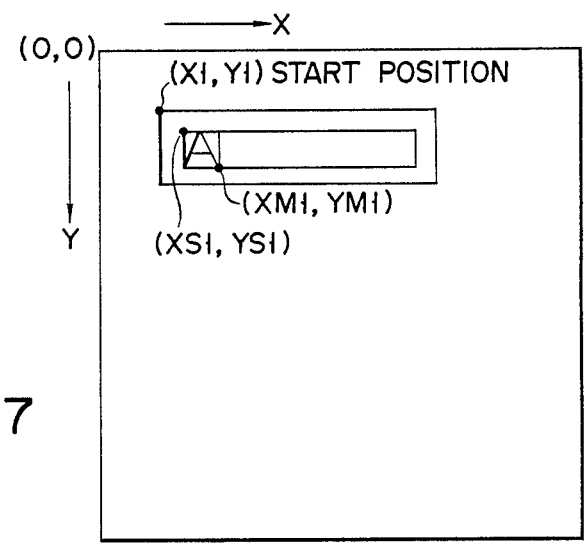
FIG. 7

PRINTER APPARATUS

BACKGROUND OF THE INVENTION

1. Field of the Invention

The present invention relates to a printer apparatus which performs printing in accordance with the printing pattern stored in a frame memory, and more particularly to a printer apparatus which produces satisfactory print even if part of a printing pattern is often changed

2. Description of the Related Art

Various kinds of labels are used in the business of administering the manufacturing process, ordering, stock, sales, etc. In many cases, the article information needed for the administration is represented by characters and bar codes printed on a label, and this label is adhered to the corresponding article. Since the bar code on the label can be easily read by an optical reader, the use of such a bar code is advantageous in the automation or rationalization in the business of administration. FIG. 1 shows an example of an administration label, such as that mentioned above. The label shown in FIG. 1 is divided into a plurality of regions by ruled lines. Titles, such as "Receiver", "Part No.", "Serial No.", "Date", etc. and the article information corresponding to these titles are printed in the respective divided regions. On the label, the article information and its title are expressed as a string of characters including numerals and symbols, but part of the article information is expressed as a bar code. Incidentally, the characters used for indicating the title are smaller than those used for indicating the article information.

A conventional printer apparatus used for printing data on such an administration label will be described. The conventional printer apparatus comprises: a frame memory for storing the printing pattern for one label; a printing head driven in accordance with the printing pattern stored in the frame memory; and a processing circuit for producing a printing pattern in the frame memory in accordance with a plurality of pieces of printing data (e.g., a ruled line, a title, and article information) supplied from an external host computer. The processing circuit includes a font memory for storing various types of fonts (i.e., the fonts for the ruled lines, characters, bar codes, etc.). Each of the fonts is selected by a corresponding data included in the printing data and is read out of the font memory. To prepare a printing pattern, the readout font is developed in the frame memory, to thereby form a graphic pattern having a desirable size. This graphic pattern is expressed by use of a plurality of memory bits which are employed by the frame memory and arranged in a matrix pattern. All these memory bits are cleared to be "0" in logic level beforehand (the "0"-level memory bits correspond to a spa e portion where the printing head does not effect printing), and are selectively set to "1" in logic level to express the graphic pattern (the "1"-bit memory bits correspond to a dot portion where the printing head effects printing).

The character font uses a vector format for representing the outline of a character image within a font frame having a predetermined size. In general, it is desirable for the character font to be designed in such a way as to produce the largest possible character images while simultaneously leaving a certain margin along the font frame. If the character font is designed like this, the quality of print can be improved, and adjacent characters are prevented from being in contact with each other when they are printed. However, in the case where both an unornamented-character font and an ornamented-character font are stored in the font memory, the character image of the unornamented-character font is made to have the same size as the character image portion of the ornamented-character font (the character image portion being a portion obtained by excluding the ornamentation from the ornamented character). By so doing, a character of the unornamented-character font and a character of the ornamented-character font look satisfactorily balanced even if they are printed adjacent to each other on the label. As is seen from the graphic forms shown in FIG. 2, therefore, unornamented-character fonts F1-F4 produce an undesirably wide margin above their character images, while ornamented-character fonts F5 and F6 hardly produce a margin above their character image. The margin of the unornamented-character fonts is considerably enlarged when the fonts are developed in the frame memory.

Incidentally, article information is often changed in comparison with ruled lines or titles. In a conventional printer apparatus, therefore, that area of the frame memory which is determined by the attributes (namely, the frame size, the developing magnification, the developing start position, and the number of fonts) of the character fonts corresponding to the character string of the article information to be changed, is cleared. In this area of the frame memory, a character font corresponding to the character string which should replace the character string of the article information is developed. In the case where the character string of the article information is comprised only of unornamented characters and does not include any ornamented character, the developing magnification of these character fonts is sometimes set to be larger than in the case where the character string includes ornamented characters, so as to print the character string to have the largest possible size within the label region which is surrounded by the ruled lines, title, and bar code. If the character string of the article information is changed in the case where the developing magnification is set to be larger as above, the ruled lines, title and bar code may not be partly printed, as is shown in FIG. 3.

One method for solving this problem may be to replace the printing pattern in the frame memory with a new one and to effect printing on the basis of the new printing pattern. If this method is used, however, a long time is required for the preparations of printing, so that the printing on a label cannot be started at once. Another method for solving the problem may be to inhibit the developing magnification from being increased with respect to the character fonts which correspond to the character string of the article information including no ornamented characters. However, this alternative method restricts the flexibility in label layout, and it becomes impossible to make good use of the label region surrounded by the ruled lines, title, and bar code. The printing preparation time and the flexibility in label layout are important factors which the users consider when deciding to buy printer apparatuses. On the part of the manufacturers, therefore, it is necessary to provide a printer apparatus free from the problem noted above.

SUMMARY OF THE INVENTION

Accordingly, an object of the present invention is to provide a printer apparatus which prints an image corresponding to items of printing data without causing any loss around a character portion in the image even if the printing data for the character portion is changed or updated.

To achieve this object, the present invention provides a printer apparatus which comprises a frame memory for storing a printing pattern, a printing head driven in accordance with the printing pattern stored in the frame memory, and processing circuit for producing a plurality of graphic patterns in the frame memory in accordance with a plurality of items of printing data which are externally supplied, to thereby form a printing pattern, wherein the processing circuit includes a distribution data memory for storing image distribution data indicating a frame memory area which is occupied by an image portion of a graphic pattern corresponding to the printing data to be changed and from which marginal portions of the graphic pattern is excluded, and area-releasing circuit, responsive to the supply of printing data which should be used in place of the printing data to be changed, for reading image distribution data relating to the printing data to be changed, out of the distribution data memory, and for clearing the frame memory area specified by the image distribution data.

The printer apparatus of the present invention operates as follows. In the case where a printing pattern is to be partly changed, the frame memory area used for storing the image portion of the graphic pattern corresponding to the printing data (the image portion being a portion obtained by excluding the marginal portions from the graphic pattern), is cleared. Thus, even if the graphic pattern is set to be larger than an ordinary size, with its marginal portions overlapping the frame memory area in which a pattern of a ruled line is stored, the pattern of the ruled line is prevented from being undesirably erased when the graphic pattern of new printing data is stored in the frame memory. Accordingly, the degree of freedom for layout is in no way restricted, as a result of the shortening of the printing preparation time. Further, the printing preparation time is in no way lengthened, as a result of the maintenance of the degree of the printing preparation time.

BRIEF DESCRIPTION OF THE DRAWINGS

FIG. 3 shows a label obtained when the developing magnification of unornamented-character fonts, such as those shown in FIG. 2, is set to be larger than an ordinary value;

FIG. 4 is a circuit diagram of a printer apparatus according to one embodiment of the present invention;

FIG. 5 shows an example of outline data which is stored in a font memory for the construction of a character font;

FIG. 6 shows a graphic pattern obtained by the outline data shown in FIG. 5;

FIG. 7 shows how a graphic pattern is arranged in a frame memory;

DETAILED DESCRIPTION OF THE PREFERRED EMBODIMENTS

Figures 1, 2:
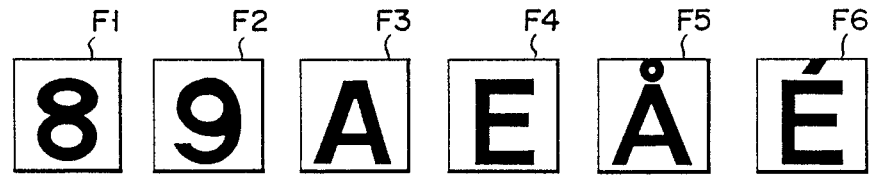
FIG. 1 shows an example of an administration label.
FIG. 2 shows graphic forms of examples of unornamented- and ornamented-character fonts stored in a font memory.

A printer apparatus according to one embodiment of the present invention will now be described, with reference to FIG. 4 through FIG. 9B. This printer apparatus is used mainly for producing such a label as was explained in the "Background of the Invention".

FIG. 4 shows a circuit diagram of the printer apparatus. The printer apparatus comprises a CPU 1, a program memory 2, a font memory 3, a backup memory 4, and a data buffer 5. These structural components are connected together by a bus BS. The program memory 2 and the font memory 3 are a ROM, while the backup memory 4 and the data buffer 5 are a RAM. The backup memory 4 is backed up by a battery or the like, so that its contents are not lost even if the power source is cut. The CPU 1 performs various kinds of printing control by executing the control programs stored in the program memory 2. The font memory 3 stores various kinds of fonts for characters, ruled lines and bar codes. The backup memory 4 includes a plurality of registers needed for the printing control processing, and stores important data which should not be lost even if the power source is cut. The data buffer 5 is used for temporarily storing the data which is input or output for carrying out the printing control processing. The printer apparatus further comprises a communication interface 6, a frame memory 7, a motor driver 8, and a head driver 9. These structural components are connected to the CPU 1 by way of the bus BS. The communication interface 6 is also connected to an external host computer HC. The motor driver 8 is connected to a paper feeding mechanism 10, and the head driver 9 is connected to a thermal head 11. The communication interface 6 is constituted by an asynchronous transceiver (UART), for example. From the host computer HC, the communication interface 6 receives printing data and control commands which correspond to the ruled lines, titles and article information of a label, and sends the printing data and control commands to the CPU 1. The frame memory 7 is used for storing the printing pattern corresponding to one label. The frame memory 7 includes a plurality of bit memories arranged in a matrix pattern. The motor driver 8 drives the motor of the paper feeding mechanism 10 such that a sheet of paper is fed with reference to thermal head 11 at the time of printing. The head driver 9 is used for driving the thermal head 11 in accordance with the printing data stored in the frame memory 7.

Where printing is performed by use of the above printer apparatus, the layout of data to be printed on a label is determined by the host computer HC. In this host computer HC, data to be printed is classified into fixed printing data (i.e., data which is not to be changed) and unfixed printing data (i.e., data which is to be changed), and identification data is attached to each of the fixed and unfixed printing data. For example, ruled lines and the characters of titles are treated as fixed printing data, while bar codes and the characters of article information representing a company name, a trade name, a serial number, etc. are treated as unfixed printing data. The fixed printing data and unfixed printing data are supplied from the host computer HC to the printer apparatus, together with format data representing the related printing start coordinates and developing magnification. On the side of the printer apparatus, the communication interface receives the data pieces supplied from the host computer HC. The received data pieces are first stored in the backup memory 4 under the control of the CPU 1, and are then analyzed one by one. Of the printing data thus analyzed, the data representing characters, ruled lines and bar code is supplied to the font memory 3, and one of the fonts stored in the font memory 3 is selected. The selected font is read out of the font memory 3, and is then developed in the frame memory 7 on the basis of the printing start position and developing magnification determined by the format data. After all printing data pieces are developed in the frame memory 7, the head driver 9 starts the driving of the thermal head 11. At the time, the CPU 1 reads the printing pattern out of the frame memory 7 in units of one line, and supplies the readout printing pattern to the head driver 9. Accordingly, the thermal head 11 performs a printing operation for one-line data. The motor driver 8 causes the paper feeding mechanism to feed a sheet by the predetermined pitch in synchronism with the printing operation performed for one-line data.

FIG. 5 shows an example of outline data which is stored in the font memory 3 for the construction of a character font. The outline data includes point data representing points constitute the outline of a character when the points are connected by linear lines. Each piece of point data is expressed by an attribute, an X-coordinate, and a Y-coordinate. In FIG. 5, attribute "1" represents a starting point, attribute "2" represents a middle point, and attribute "3" represents an ending point. When a character font is developed as a graphic pattern, the minimum and maximum values XSl and XM1 for the X-coordinates and the minimum and maximum values YSl and YM1 for the Y-coordinates are detected, so as to specify the range of the image portion of the graphic pattern.

FIG. 6 shows a graphic pattern obtained by the outline data shown in FIG. 5, and FIG. 7 shows graphic pattern arranged in the frame memory 7. Assuming that the coordinates at the upper left end of the developed character font are (X1, Y1) and that the upper left end of the character image is set apart from the upper left end of the developed character font by XC in X-coordinate and YC in Y-coordinate, the minimum value XS1 for the X-coordinates of the developed character font is expressed by XS1 = X1 + XC. Likewise, the minimum value YS1 for the Y-coordinates of the developed character font is expressed by YS1 Y1 + YC.

The backup memory 4 is made up of a plurality of registers and a storage section, so as to allow partial change of the data to be printed. In the registers of the backup memory 4, the data regarding the following is stored: the number M of characters included in a developed character font string; the order N of a developed character font; the minimum X-coordinate XS1 of the developed character font; the minimum Y-coordinate YS1 of the developed character font; the maximum X-coordinate XM1 of the developed character font; the maximum Y-coordinate YM1 of the developed character font; the minimum X-coordinate XS2 of the developed character font string; the minimum Y-coordinate YS2 of the developed character font string; the maximum X-coordinate XM2 of the developed character font string; and the maximum Y-coordinate YM2 of the developed character font string. In the storage section of the backup memory 4, MS2, YS2, XM2 and YM2 are stored in accordance with the order of the character font string.

The embodiment mentioned above provides a structure which processes the fixed printing data and the unfixed printing data independently of each other. When the unfixed printing data is developed in the frame memory 7 as a graphic pattern, a check is made with respect to the dimensions of the area in which the dots constituting the image portion of the graphic pattern are distributed. Distribution information, thus obtained, is stored in the backup memory 4. In the case where new unfixed printing data is supplied from the host computer HC, for a partial change of the printing contents, the frame memory area occupied by the image portion of the graphic pattern of the unfixed printing data which is to be replaced with the new unfixed printing data is detected on the basis of the distribution data, and the area thus detected is cleared. By executing this processing, the frame memory area in which the dots of the image portion of the graphic pattern obtained by developing the character font are not distributed is left uncleared. The fonts selected by the character data items included in the new unfixed printing data are read out of the font memory 3. In accordance with the format data for the new unfixed printing data, the fonts are developed in the frame memory 7 from the designated positions and at the designated developing magnification.

In the above embodiment, only that area of the frame memory 7 that corresponds to the character image portion is cleared, and only the new image portion is written in the cleared area of the frame memory 7. In the conventional case, in contrast, all area corresponding to the maximum matrix determined for the design of a character font is cleared (for example, the area having dimensions of 32×32 dots is cleared in the case of a 32×32 dot matrix character), so that the image portion of the neighboring fixed printing data is deleted at the time when the font memory area is cleared. The embodiment of the present invention does not have such disadvantage, and permits only the image portion of unfixed character data to be rewritten. Consequently, it is possible to shorten the time needed for partial change of the printing contents. It is also possible to freely determine the size of graphic patterns, thus eliminating the restrictions in the design of the label.

Figure 8A:
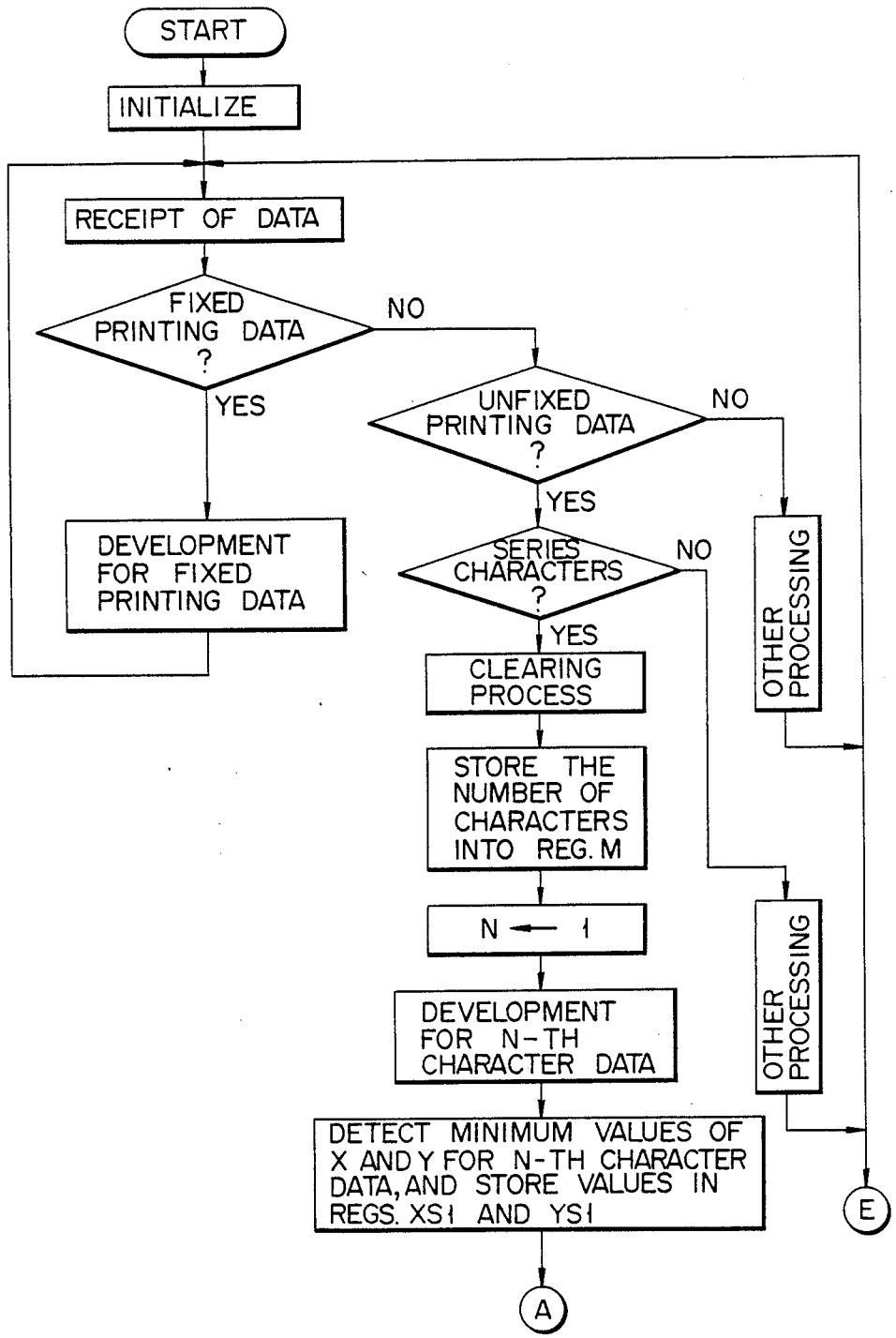
FIGS. 8A to 8C are flow charts for explaining the operation of the printer apparatus shown in FIG. 4.
Figure 8B:
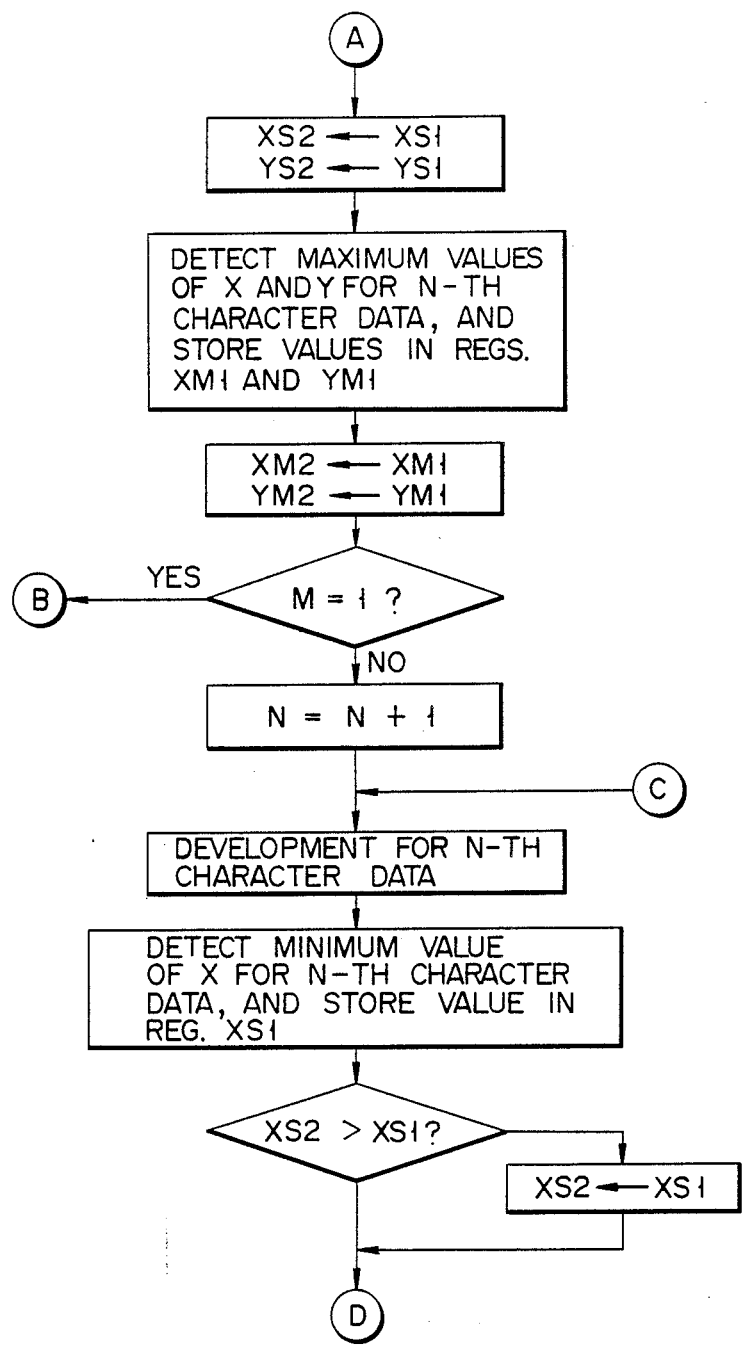
Figure 8C:
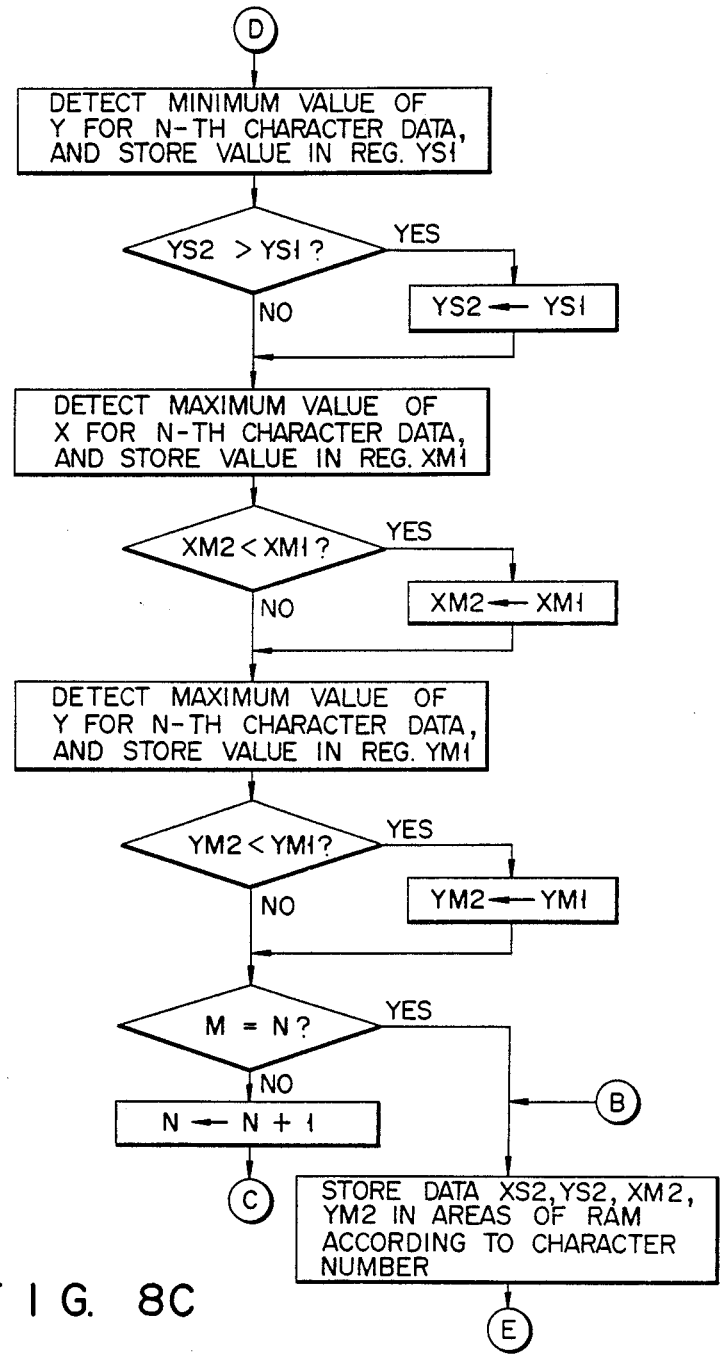

The operation featuring the printer apparatus of the present invention will now be described, with reference to the flow charts shown in FIGS. 8A to 8C. When the power source is turned on, the CPU 1, the peripheral circuits, the memories, etc. are initialized in step S1, and the printer apparatus waits for data to be received in step S2. When data is received, its contents are analyzed in steps S3 and S5. If the received data is determined as fixed printing data in step S4, the related ruled lines, title, etc. are developed in the frame memory 7 in step S4. If the received data is determined as unfixed printing data in step S5, coordinate data indicating the area to be cleared is read out of the backup memory 4, and the area indicated by the coordinate data is cleared in step S6. After this clearing process, the received unfixed printing data is developed in the frame memory 7 in steps S7 and S8. Subsequently, the maximum and minimum coordinate points of the developed characters are detected, and the values of the detected points are stored in the backup memory 4 as coordinate data indicating the cleared area in step S9. That area of the frame memory 7 indicated by this coordinate data is cleared when the next unfixed printing data is developed in the frame memory 7. After a partly-changed printing pattern is produced in the frame memory 7 in this fashion, it is printed on a label by the thermal head 11 driven by the head driver 9.

Figure 9A:
FIGS. 9A and 9B show a frame memory area which is cleared by the operation performed according to the flow charts shown in FIGS. 8A to 8C.
Figure 9B:

In the case of a conventional printer apparatus, all the X×Y range corresponding to the matrix of developed character fonts has to be cleared, as is shown in FIG. 9A. In the case of the printer apparatus of the present invention, however, only the X×Y1 range (Y1 <Y) has to be cleared (the X×Y1 range being a range where the dots of the characters are distributed). Thus, the area used for the ruled lines or fixed printing data is prevented from being undesirably cleared.

In the present invention, only that area of the frame memory 7 that corresponds to the character image portion is cleared, and the image portion of new unfixed printing data is written in the cleared area of the frame memory 7. Since, therefore, only the characters that have to be changed or updated are rewritten in the frame memory 7, the time needed for starting the printing operation can be shortened. In addition, the size of the fonts can be arbitrarily determined, thus eliminating the restrictions in the design of the label.

The present invention is not limited to the embodiment which was described above with reference to the accompanying drawings. Needless to say, the invention can be embodied or modified in various manners, without departing from the spirit and scope thereof. For instance, the above embodiment was described, referring to the case where only the character image portion of unfixed printing data is changed, but this in no way limits the invention. Further, data need not be printed on a label, as in the above embodiment; any kind of a sheet material may be used in place of the label as long as image data can be printed thereon. Where ornamented character of some kinds are printed, it may happen that an area in which the character image of fixed printing data will be cleared. However, since such an area is detected on the basis of distribution data, that portion of the fixed printing data corresponding to such an area can be overwritten. Since this processing need not be performed unless ornamented characters are printed and since the occasion to use ornamented characters is rare in practice, it can be said that the printer apparatus of the present invention as a whole can fully accelerate the processing associated with partial change of printing contents.

What is claimed is:

1. A printer apparatus, comprising:
a frame memory for storing a printing pattern;
a printing head driven in accordance with the printing pattern stored in the frame memory; and
processing means for producing a plurality of graphic patterns in the frame memory in accordance with a plurality of items of printing data which are externally supplied, to thereby form a printing pattern, wherein said processing means includes a distribution data memory for storing image distribution data indicating a frame memory area which is occupied by an image portion of a graphic pattern corresponding to printing data to be changed and from which marginal portions of the graphic pattern are excluded, and area-releasing means, responsive to the supply of printing data which should be used in place of the printing data to be changed, for reading image distribution data relating to the printing data to be changed out of the distribution data memory and for clearing the frame memory area specified by the image distribution data.

2. A printer apparatus according to claim 1, wherein said processing means includes detecting means for detecting a frame memory area which is occupied by an image portion of a graphic pattern corresponding to printing data to be changed and from which marginal portions of the graphic pattern are excluded, and for storing into said distribution data memory an image distribution data indicating the frame memory area.

3. A printer apparatus according to claim 2, wherein said processing means includes checking means for checking identification data attached to the printing data to determine whether the printing data is to be changed, or not.

4. A printer apparatus according to claim 1, wherein said printing data correspond to ruled lines for dividing a label into a plurality of regions, items of article information formed in the regions, and titles of said article information items.

5. A printer apparatus according to claim 4, wherein the printing data to be changed includes a string of character data required to form an article information.

6. A printer apparatus according to claim 5, wherein said processing means includes a font memory for storing various character fonts in a vector form.

* * * * *